April 12, 1960   G. R. HARRIS   2,932,036
SINK MOUNTING DEVICE
Filed Oct. 14, 1957

INVENTOR:
G. R. HARRIS,
BY O. O. Martin
ATTORNEY

# United States Patent Office 2,932,036
Patented Apr. 12, 1960

2,932,036
SINK MOUNTING DEVICE
George R. Harris, Montrose, Calif.

Application October 14, 1957, Serial No. 690,040

1 Claim. (Cl. 4—187)

This invention relates to kitchen utensils and has particular reference to improvements in sink mountings, such as shown and described in Patent No. 2,584,581 issued to me on February 5, 1952.

Stainless steel sinks are becoming increasingly popular, partly because they will give service over a great number of years without chipping or cracking. And perhaps even more for the reason that a plurality of stainless steel sinks, as well as other stainless steel utensils, may be placed evenly side by side to present an even, unbroken top surface. In conventional practice, where enameled cast iron sinks are combined with sheet metal top utensils, such as kitchen ranges, and with tile surface counters, no such uniformity is attainable but deep grooves and projecting rims appear on the surface thereof.

While this method of combining stainless steel utensils marks an important forward step in the art, it has been found that great care and much time is spent in producing the combination of the utensils in such manner that perfectly even and smooth top surfaces may be obtained.

It is in view of the foregoing the object of the present invention to provide a stainless steel utensil as well as a combination of such utensils in which the exposed top surfaces of the utensils present a continuous, even, smooth and unbroken surface. A further object is to provide a utensil mounting and assembling device which is economical to manufacture, convenient to manipulate and which will present perfectly straight and even combined surfaces. The invention resides in the combinations hereinafter fully described and illustrated in the drawings hereto appended.

Figure 1:
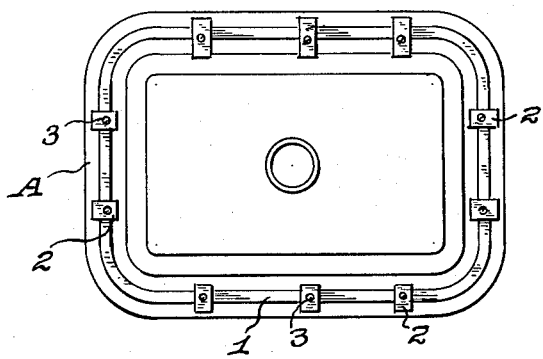
Fig. 1 is an inverted plan view of a kitchen sink fitted with the mounting and combining devices of the invention.
Figure 2:
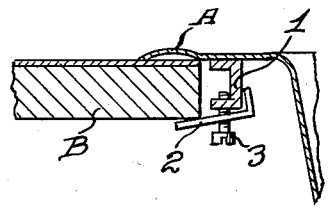
Fig. 2 is a fragmentary, cross sectional view showing the manner in which a sink embodying such mounting devices is secured in position on a drain board.

As shown in Fig. 1, a rectangular clamping frame 1 is welded or brazed in position on the underside of the flange A of a sink and this frame may be U-shaped in cross section, substantially as indicated in Fig. 2 of the drawings. The corners of the frame are curved to conform to the shape of the sink flange A. The sink flange is shown to rest on a drain board B and the sink is held clamped in position thereon by means of a series of plates 2. Bolts 3 extend through the plates to seat in threaded perforations of the frame. When the bottom surface of the frame 1 is slightly above the under surface of the drainboard, substantially as indicated in Fig. 2, it is seen that the bolts will clamp the sink flange rigidly in position on the drain board.

It has heretofore been suggested to mount a series of individual clamping bosses on the sink flange, but because of variations in the flange surface, in the drain board and in the boss mountings, it has been found that shallow indentations may be apparent in the exposed upper surface of the sink flange. By making the frame in one straight piece, such irregularities are entirely eliminated and the flange presents a continuous, even and smooth upper surface. This is a most important improvement in stainless steel mountings where the slightest variation in the highly polished surface becomes very conspicuous.

Figure 3:
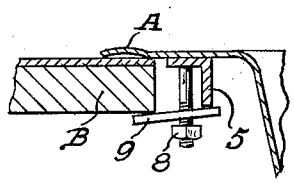
Fig. 3 illustrates a somewhat modified form of sink mounting device.

As illustrated in Fig. 3 of the drawings, the U-shaped frame 1 may be replaced by an angular frame 5, in the upper horizontal portion of which a series of threaded studs 7 are rigidly seated, as by a welding operation, and threaded nuts 8 will advance the plate 9 on the studs tightly to clamp the sink flange in position on the drain board. Whether the plates 9 are flat or L-shaped, as shown in Fig. 2, they provide positive simple means of clamping the sink in position; the only advantage of the angle shape being that it renders the assembly more convenient in that the flanges prevent rotation of the plates during the assembling operation.

Figure 4:
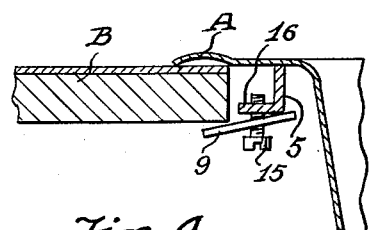
Figs. 4 and 5 illustrate further modifications of the device.

This construction may be further modified, as indicated in Fig. 4, by inverting the frame 5 of Fig. 3 and seating bolts 15 in threaded apertures of the lower horizontal portion 16 of the inverted frame. But the plates 2 may remain unchanged.

Figure 5:
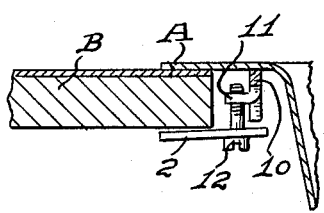

Fig. 5 is added to show that the frame may consist of a flat bar 10 which is bent into the required angular shape. A series of lugs 11 are extruded from the bar side surface to receive bolts 12 by means of which the sink flange is rigidly clamped in position on the drain board. But the plates 2 may still remain unchanged.

Figure 6:
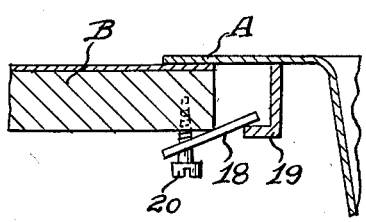
Fig. 6 shows another important modification of the sink mounting.

As shown in Fig. 6, the combination of Fig. 4 may be modified by placing the plates 18 above the horizontal flange 19 of the frame. When this flange is above the lower surface of the drain board and wood screws extend through the flange, the screws may be advanced into the drain board to draw the sink flange tightly in position thereon.

Figure 7:
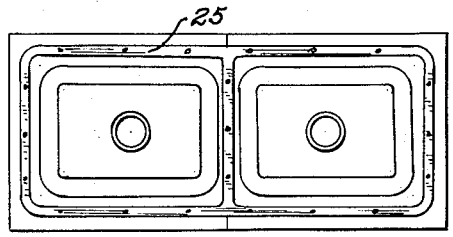
Fig. 7 is added more clearly to show the manner in which kitchen utensils may be combined in accordance with the method of the present invention.

It was above given as an object of the invention so to combine stainless steel utensils that they will present a continuous, even, smooth and unbroken surface. This may be done as illustrated in Fig. 7 by providing a single frame 25 of any one of the cross sectional shapes shown in the drawings for all the utensils. When the surface of this frame, contacting the flanges of the utensils, is made perfectly straight, by grinding or otherwise, it is found that the exposed surface of the combined utensils will be perfect. It should be understood that this type of frame may be enlarged and shaped to extend over additional utensil flanges to produce any desired utensil combination.

I claim:

A device for mounting flanged kitchen utensils on a drain board comprising, a horizontally straight frame of a contour fittingly to contact the utensil flanges and rigidly secured in position thereon, the frame having at the bottom thereof a rib horizontally directed toward the edge of the drain board, the upper surface of the rib being a distance above the under surface of the drainboard, perforated clamping plates resting on the frame rib and extending along the under surface of the drain board, and screws extending through the plate perforations into the drain board to clamp the utensil flanges in position on the drain board.

References Cited in the file of this patent

UNITED STATES PATENTS

| | | |
|---|---|---|
| 1,727,159 | Coulter | Sept. 3, 1929 |
| 1,873,349 | Smith | Aug. 23, 1932 |
| 2,472,685 | Scharmer | June 7, 1949 |
| 2,582,463 | Skinner | Jan. 15, 1952 |
| 2,584,581 | Harris | Feb. 5, 1952 |

FOREIGN PATENTS

| | | |
|---|---|---|
| 489,016 | Canada | Dec. 23, 1952 |